United States Patent

[11] 3,622,507

[72] Inventor Aale Pasveer
    The Hague, Netherlands
[21] Appl. No. 55,917
[22] Filed July 17, 1970
[45] Patented Nov. 23, 1971
[73] Assignee Nederlandse Organisatie Voor Toegepast-
    Natuurwetenschappelijk Onderzoek Ten
    Behoeve Van De Volksgezonheid
    The Hague, Netherlands
[32] Priority July 23, 1969
[33] Netherlands
[31] 6,911,263

[54] ACTIVATED SLUDGE PROCESSING
    4 Claims, 2 Drawing Figs.
[52] U.S. Cl. .................................................. 210/6,
                                                    219/12
[51] Int. Cl. .................................................. C02c 1/02
[50] Field of Search ........................................ 210/1, 3-9,
                                                    10, 12, 18, 56, 71

[56] References Cited
    UNITED STATES PATENTS
    3,256,179  6/1966  Teletzke ........................ 210/8
    3,401,115  9/1968  Meyer et al. ................... 210/60

Primary Examiner—Michael Rogers
Attorney—Hammond & Littell

ABSTRACT: A method is shown for partly decomposing the surplus "activated sludge" from sewage purification plants.
The activated sludge is made alkaline and heat treated between 90° and 180° C. An easily separable residue is separated and the remaining solution containing a large part of the decomposed organic matter of the original sludge is recycled into the activated sludge process.
A treatment plant is described more in detail.

PATENTED NOV 23 1971

3,622,507

INVENTOR.
AALE PASEER
BY
*Hammond and Littell*
ATTORNEYS

ACTIVATED SLUDGE PROCESSING

The invention relates to a method and installation for processing surplus activated sludge produced in a biological wastewater purification plant.

In aerobic and anaerobic biological purification of domestic, agricultural and industrial wastewater, the polluting organic matter is converted by bacterial action. The bacteria thereby multiply, forming substantial quantities of bacterial sludge, which are removed from the purification installation in the form of "surplus sludge" or, after anaerobic digestion, as digested sewage. These substances have a very high water content (95–99 percent by weight).

Before removal of the sludge, it is concentrated as far as possible. It is often placed on drying beds and air-dried. Such dried sludge still contains about 75 percent by weight of water. The use of drying beds has the drawback, especially for larger installations, of the large area they need, partly owing to their dependence upon climatic conditions.

It is known that with the traditional activated sludge installation mainly for domestic wastewater, about 70 g. sludge (as dry matter) is produced per inhabitant equivalent per day. For the "oxidation ditch" (Pasveer ditch), with which the detention period of wastewater in the installation is much longer, production is about 30 g. sludge (dry matter). (See Netherlands Pat. No. 87,500, British Pat. No. 796,438).

If the sludge is dried on drying beds in both types of purification installation, quantities of 70 kg. and 32 kg. dry sludge matter respectively per inhabitant per annum are produced. Liquid or drying-bed sludge is becoming increasingly difficult to sell.

To eliminate these drawbacks, artificial drying, oxidation at 250°–375° C. or incineration is frequently envisaged.

In the latter case, only the mineral constituted, the ash, need be removed. These methods, however, have the drawback of high cost owing to the large quantities of water that have to be evaporated.

Even if the sludge is first concentrated as far as possible by filtering of centrifuging—for which chemicals can be used as filter aids or coagulation aids—the total cost of artificial drying and also of the incineration process remain so high that they are seldom applied. Nevertheless the constantly rising sludge production is leading to increasing acceptance of the idea that in the immediate future the said high costs will have to be faced as unavoidable.

The sludge produced by biological purification consists mostly of live and dead bacteria. Of these bacteria, the capsules and cell walls of many types are bacteriologically decomposed—aerobically or anaerobically—only very slowly. The bacteria capsules are built up from polysaccharides or polypeptides; the cell walls consist substantially of polysaccharides and a polypeptidemuramino acid complex.

The principle of the invention is that the organic constituents of the sludge which are difficult to decompose bacteriologically are split by alkaline hydrolysis at elevated temperature into smaller molecules which can, however, quickly be converted bacteriologically. If these splitting products are then returned to the purification process they are decomposed completely.

The invention consists in that the surplus aerobic and/or anaerobic sludge formed during purification is brought to pH 10–13 by addition of alkali and then hydrolyzed at temperatures between 90° and 180° C. and, after separation of an insoluble residue, the resulting decomposition products are recycled into the purification process where they are converted further.

The desired result can be obtained when so much alkali is added that the pH is 10–13 (measured at room temperature) before hydrolysis. After hydrolysis the pH may be one or two units lower, since part of the alkali is combined during hydrolysis.

In carrying out the method, caustic soda solution is preferably used for obtaining the required alkalinity. With calcium hydroxide, the desired pH cannot be obtained. The hydrolysis process is accelerated by certain reducing agents. Especially sulfides—sodium sulfide, alkaline earth metal sulfides, ammonium sulfide, but also organic sulfydril compounds—have an accelerating effect, probably owing to their influence upon opening the numerous disulfide bridges. Colloidal sulfur suspensions (sulfur sols) also have catalytic action. Catalytic action of a different nature is exerted by the strongly hydrated lithium ion. The use of catalysts may have advantages, but their application is not necessary for the alkaline hydrolysis according to the invention.

The hydrolysis can be carried out without an increase in pressure at temperatures of 90° to 100° C. The reaction time may then be several hours.

Under pressure at higher temperatures the desired result is of course obtained in a shorter time: at 180° C. in as little as about 15 minutes (the necessary heating time also influences this). This latter method will be preferable when large quantities of sludge are treated. The alkalized sludge brought to a certain dry matter content can then for instance be fed into continuous-flow high-pressure reaction vessels. These have been developed for the Porteous process for conditioning freshly sedimented wastewater sludge in order to filter it better.

If desired, the added heat energy can of course be largely recovered in a heat exchanger.

The quantity of caustic soda (NaOH) needed for obtaining the desired pH is, apart from exceptional cases, not more than 20 parts by weight of solid NaOH to 100 parts by weight of sludge dry matter.

It can be calculated that in the case of domestic wastewater not more than 10 kg. NaOH solution of 32 percent by weight is needed per inhabitant equivalent per annum. For aerobic purification of the hydrolysis products an additional power consumption of 6 kw.-hr. per inhabitant per annum must be allowed for.

Hydrolysis produces a dark-colored liquid containing a lighter-colored mineral sludge. The latter (after dilution with effluent if desired) is separated in a sedimentation process, by filtering or centrifuging. The liquid is returned to the purifying installation. The alkali in the hydrolysate is converted in the purification process into sodium bicarbonate, which is removed with the effluent. As sodium bicarbonate is a natural constituent of all surface water, there is no objection to this.

The separated mineral sludge is the only sludge which is removed from the purification installation by the operation according to the invention. This mineral sludge is easy to separate from the liquid by sedimentation and/or filtration. It usually has an ash to dry matter content of 55 to 65 percent. This content depends not only on composition of the wastewater being treated, but also on the duration and on the temperature during alkaline hydrolysis.

When domestic wastewater is treated according to the invention, only about 8 kg. residue per inhabitant per annum is obtained, with a water content of 40 to 45 percent. Storage of this residue causes few problems, either as regards quantities or properties: it contains no pathogenic bacteria.

With the process according to the invention a mineral sludge with a low organic matter content is removed from the installation. (About 80 percent of the organic matter from the sludge dissolves; 20 percent remains in the residue). There is no longer any need for anaerobic or aerobic stabilization of an organic surplus sludge.

Some embodiments of the hydrolysis process according to the invention are illustrated in the following examples:

EXAMPLE I.

A laboratory purification installation with a volume of 15 liters designed on the principle of the Pasveer oxidation ditch was fed for several weeks at intervals of 4 hours, with sewage from a small community (the Sancta Maria Mental Home at Noordwijkerhout), the average detention period of the liquid in the installation being 72 hours. Each day a quantity was taken from the installation, concentrated to 99 percent water content, alkalized with 2 g. NaOH per liter liquid and hydrolyzed for 7 hours at 100° C., during which 86-94 percent by weight of the organic matter in the sludge dissolved.

By diluting and sedimenting, the residue produced by hydrolysis was separated. The hydrolysate was returned to the installation. With this method it can be expected that if too much is taken from the installation the suspended matter will decrease; if too little is taken it will rise.

This is shown clearly in the accompanying table. From the 1st to the 10th day, 1,200 ml. a day was taken from the installation; the dry matter content thereby fell from 8.2 g./l. to 5.9 g./l. on the 9th day. In the subsequent period only 600 ml./day was removed, with the consequence that the dry matter content slowly increased again.

TABLE A

| Date | Sludge removed daily, ml. | Suspended dry matter, g./l. | Composition of effluent | | | |
|---|---|---|---|---|---|---|
| | | | DOC, mg./l. | NH$_4$-N | NO$_3$-N | Total P |
| 1/4 | 1,200 | 8.2 | 37 | 0.5 | 21 | 10.8 |
| 9/4 | 1,200 | 5.9 | 59 | 10.0 | 32 | 10.5 |
| 10/4 | 1,200 | | | | | |
| 11/4 | 600 | | | | | |
| 15/4 | 600 | 6.4 | 90 | 1.6 | 43 | 8.5 |
| 22/4 | 600 | 6.2 | 60 | 0.5 | 17 | |
| 29/4 | 600 | 7.3 | | | | |

NOTE.—DOC=dichromate oxygen consumption.

The table also shows that an effluent is obtained with a quite normal composition. The D.O.C. in only slightly increased as compared with the results without returning hydrolysate. D.O.C. values of 50-80 mg./l. are also found without returning hydrolysate.

Repeating the test, again with sewage from the same small community, produced identical results. In addition, a corresponding result was also obtained with a similar laboratory installation, now fed with simulated dairy wastewater.

In the hydrolyzing process part of the phosphate in the sludge dissolves, partly owing to the composition of the treated sludge and the applied temperature and pressure. As the hydrolysate is returned to the purification installation for aerobic or anaerobic decomposition, these phosphates ultimately arrive partly in the effluent. Where necessary, this can be prevented by adding calcium hydroxyde and/or iron salts before or after hydrolysis.

In the case of the laboratory installation fed with sewage from the small community, about 75 percent of the phosphorus compounds in the sludge was removed in the residue, and 25 percent was returned in the hydrolysate to the aeration tank.

In treatment of the dairy wastewater, however, all the phosphorus was removed via the residue.

EXAMPLE II

Of the anaerobically digested sludge from the IJsselmonde purification plant (cold digestion) it was found, after hydrolysis with 20 parts by weight of NaOH per 100 parts by weight of sludge for 15 minutes at 9 atm. gauge pressure, that 75.6 percent weight of the organic matter in the sludge was dissolved.

For a "hot" digested sludge, likewise from the IJsselmonde plant, the proportion was found to be 77 percent under similar conditions.

EXAMPLE III

A surplus activated sludge from the IJsselmonde purification installation was hydrolyzed with 20 parts by weight of solid NaOH per 100 parts by weight of sludge dry matter.

After hydrolysis for 6 hours at 100° C., it was found that 81.6 percent by weight of the organic matter has dissolved.

After hydrolysis for 5 minutes at 9 atm. pressure the proportion was 90 percent.

EXAMPLE IV

Of a surplus sludge from the Berkel oxidation ditch, after hydrolysis with 20 parts by weight of solid NaOH per 100 parts by weight of sludge, it was found after 2 hours at 100° C. that 48.8 percent by weight of the organic matter had dissolved, after 4 hours 73.3 percent, after 6 hours 78.5 percent and after 8 hours 79.2 percent.

After hydrolysis for 1 hour at 2 atm. gauge pressure, it was found that 83 percent of the organic matter had dissolved.

EXAMPLE V

Of the surplus sludge from the Sancta Maria oxidation ditch (see example I), it was found after hydrolysis with 30 parts by weight of solid NaOH per 100 parts by weight of sludge for 1 hour at 9 atm. gauge pressure that 85.4 percent of the organic matter in the sludge was dissolved.

EXAMPLE VI

In a pilot installation the domestic wastewater of 400 inhabitants is purified in an oxidation ditch of the Pasveer type and the sludge produced is subjected to the process of the invention, which may be called: oxylysis process.

Hydrolysis is carried out batchwise at 100° C. (that is to say without extra pressure). The caustic soda concentrations used vary from 11.4 to 23.9 parts per 100 parts sludge dry matter.

The reaction vessel used was a steam-jacketed tank. The effective capacity of the tank is 120.1. It has an agitator.

The process was carried out in batches of 1400 l./day, detention period in the reaction vessel 2 hours; or, respectively, of 1,750 l./day, detention period in the reaction vessel 1½ hours.

For each separate batch the dry matter content of the concentrated sludge was determined, after which the desired quantity of caustic soda solution was added. The temperature in the reaction vessel in all cases was 100°-101° C.

Table B summarizes the results.

TABLE B.—OXYLYSIS PROCESS IN A PILOT INSTALLATION (OXIDATION DITCH FOR 400 INHABITANTS)

| Period | No. of batches | Size of batch | Detention period in reaction vessel, hrs. | Percent dry matter in concentrated sludge | Caustic soda as percent of dry matter | Dissolved during hydrolysis | | | Ash, percent of dry residue |
|---|---|---|---|---|---|---|---|---|---|
| | | | | | | Percent organic matter [1] | Percent DOC [2] | Percent N [3] | |
| 18/2-19/3/1970 | 14 | 1,400 | 2 | 38.2 | 19.2 | 78.6 | 77.7 | 80.3 | 57.5 |
| 23/3-2/4 | 6 | 1,400 | 2 | 41.9 | 15.4 | 78.3 | 77.3 | 89.7 | 61.4 |
| 6/4-9/4 | 4 | 1,400 | 2 | 39.1 | 23.7 | 84.8 | 83.9 | 94.9 | 65.2 |
| 13/4-16/4 | 4 | 1,400 | 2 | 39.0 | 23.1 | 84.2 | 83.4 | 95.0 | 59.8 |
| 17/4-23/4 | 7 | 1,750 | 1½ | 34.7 | 11.4 | 79.1 | 78.7 | 90.3 | 58.2 |
| 24/4-28/4 | 5 | 1,750 | 1½ | 34.2 | 11.4 | 79.2 | 78.4 | 89.8 | 58.3 |

[1] Organic matter calculated from dry matter content and ash content of dry matter.
[2] Dichromate oxygen consumption.
[3] Nitrogen determined by Kjeldahl's method.

The residue which was largely freed of the matter dissolved during hydrolysis by a washing process ("in counterflow") has very good properties on the drying beds. It has absolutely no stench, it is quick drying, and is moreover sterile.

The sludge produced in the oxidation ditch (without hydrolysis) has an ash content of about 33 parts per 100 parts dry matter.

Of these mineral constituents, about 0.3–0.4 part (one-third) goes during hydrolysis into the dissolved portion of the sludge and 0.7–0.6 part (two/thirds) into the residue.

The residue has an ash content of 58 percent (see table) and hence per 100 parts primary sludge there remain ½×33×100/58× about 38 parts residue.

If, with purification in the oxidation ditch, a surplus sludge production of 30 g. per inhabitant per day is allowed for, the production of residue with the oxylysis process if 0.38×30= 11.4 grams per inhabitant per day, i.e. 4.16 kg. dry matter. With a water content of 45 percent, residue production per inhabitant per annum is then 100/100–45×4.16=7.6. kg.

The application of sludge hydrolysis in various activated sludge processes is illustrated below with reference to some flow charts shown in the drawing, in which.

Figure 1:
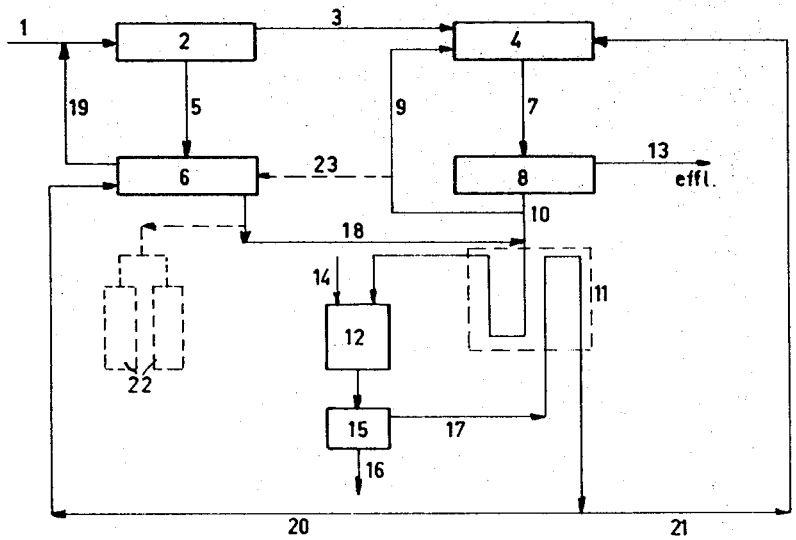
FIG. 1 shows a traditional activated sludge installation using sewage digestion, in which the digested sewage and/or the surplus activated sludge are subjected to alkaline treatment according to the invention.

In the flow chart of FIG. 1, the influent goes via pipe 1 (see FIG. 1) into the presedimentation tank 2, whence the pretreated wastewater 3 goes to aeration tank 4 and the separated primary sewage 5 goes to sewage digester 6. From aeration tank 4 the treated liquid 7 goes to postsedimentation 8. Here, sludge is separated, part of it being fed back as return sludge 9 to the aeration tank and further as surplus sludge 10 via heat exchanger 11 to a reaction vessel 12 for alkaline high-temperature decomposition. The cleaned liquid is removed as effluent at 13. The digested sewage 18 produced in digester 6 is likewise fed to the reaction vessel 12 via heat exchanger 11. At 14 caustic soda solution is added to this vessel.

The "sewage liquid" 19 from digester 6 is added by conventional means to the influent for treatment.

Under the sewage tank, broken lines show drying beds 22 on which the digested sewage is often dried in conventional installations from about 95 percent water content to about 75 percent. These drying beds need no longer be used with the installations according to the invention.

From reaction vessel 12, the reaction mixture goes to a separator 15 in which the residue 16 is removed, while the hydrolysate 17 is fed via the heat exchanger as desired either via pipe 20 to digester 6 for further anaerobic decomposition or wholly or partly via pipe 21 into the aeration tank where it is decomposed aerobically.

In conventional installations the surplus activated sludge is added to the digester. It may be advantageous to maintain this method and to supply the surplus activated sludge via pipe 23 shown by a broken line to digester 6. In this case only the digested sewage 18 is fed via heat exchanger 11 to reaction vessel 12. The hydrolysate 17 is then returned to digester 6 via pipe 20.

It will often be possible to carry out the process just described without any need to expand the existing digestion tanks. It is true that feeding the hydrolysate 17 reduces the detention period of the fresh sewage 5 for digestion and the surplus activated sludge 10 in digester 6, but this is not a drawback because less severe standards will be applied regarding the extent of mineralization (degree of digestion) of the digested sewage 18, as this sewage is now removed to reaction vessel 12 and not to drying beds 22.

Figure 2:
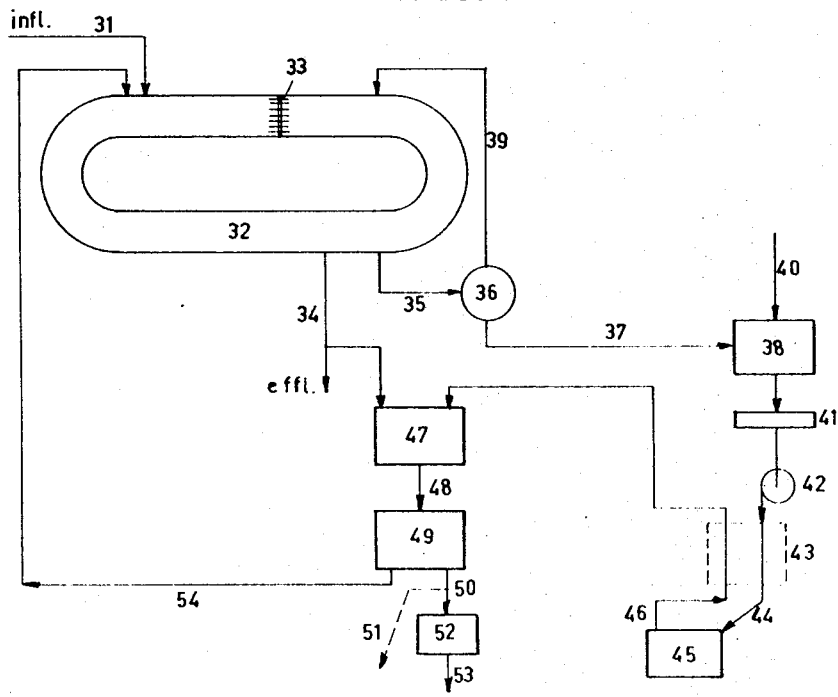
FIG. 2 shows an application of alkaline hydrolysis with an oxidation ditch installation.

In the flow chart as per FIG. 2, the wastewater enters, at 31, oxidation ditch 32 in which a rotating aerator 33 is shown. The purified liquid is removed at 34. Via pipe 35, sludge is removed from the installation and concentrated to 99–95 percent water content in a concentrator 36. The concentrated sludge 37 goes to a mixing tank 38, while a separated quantity of liquid is returned via pipe 39 to oxidation ditch 32. In mixing vessel 38 the necessary quantity of caustic soda solution is added at 40. Via a screen 41, a high-pressure pump 42 and a heat exchanger 43, this sludge passes via 44 into reaction vessel 45. The reaction mixture 46 obtained therein again goes via the heat exchanger to a diluter 47 where it is mixed with effluent from the oxidation ditch. The dilute mixture 48 is freed in a separator 49 from the residue 50 which is either removed direct at 51 or becomes available as a dried product 53 in a drier 52. The hydrolysate 54 freed from solid particles is again returned to the oxidation ditch for further complete bacteriological decomposition.

I claim:

1. A process for biological purification of waste water comprising adding sufficient alkali to aerobic and/or anaerobic surplus formed during purification to adjust the pH thereof to 10 to 13, heating the alkaline sludge at temperatures of 90° to 180° C. to hydrolyze the sludge, removing the resulting insoluble residue and recycling the resulting hydrolysate into the biological purification process for further conversion.

2. The process of claim 1 wherein the alkali is sodium hydroxide.

3. The process of claim 1 wherein the heating is effected at atmospheric pressure at 90° to 100° C.

4. The process of claim 1 wherein the heating is effected at a pressure up to 9 atmospheres gauge at about 180° C.

* * * * *